US006131635A

United States Patent [19]

Bach et al.

[11] Patent Number: 6,131,635

[45] Date of Patent: Oct. 17, 2000

[54] DEVICE FOR LONGITUDINALLY SPLITTING PIECES OF STRAW INTO SEPARATED STRANDS

[75] Inventors: Lars Bach; Kenneth W. Domier; Raymond Holowach, all of Edmonton, Canada

[73] Assignee: Alberta Research Council Inc., Edmonton, Canada

[21] Appl. No.: 09/290,390

[22] Filed: Apr. 12, 1999

Related U.S. Application Data

[63] Continuation-in-part of application No. 09/119,041, Jul. 20, 1998.

[51] Int. Cl.[7] ........ B32B 5/12

[52] U.S. Cl. ........ 156/510; 241/235

[58] Field of Search ........ 241/235, 236; 83/593; 156/510

[56] References Cited

U.S. PATENT DOCUMENTS

| | | | |
|---|---|---|---|
| 4,089,478 | 5/1978 | Collie et al. | 241/167 |
| 4,505,777 | 3/1985 | Richter . | |
| 4,773,762 | 9/1988 | Albers . | |
| 5,498,469 | 3/1996 | Howard et al. . | |
| 5,505,238 | 4/1996 | Fujii et al. . | |
| 5,610,232 | 3/1997 | Duan et al. . | |
| 5,656,129 | 8/1997 | Good et al. . | |
| 5,678,774 | 10/1997 | Bennett et al. | 241/27 |
| 5,728,269 | 3/1998 | Kohno et al. . | |
| 5,729,936 | 3/1998 | Maxwell . | |
| 5,730,830 | 3/1998 | Hall . | |

FOREIGN PATENT DOCUMENTS

| | | |
|---|---|---|
| 0 373 725 A3 | 12/1989 | European Pat. Off. . |
| 0 751 267 A1 | 6/1996 | European Pat. Off. . |
| 58037070 | 3/1983 | Japan . |
| WO 97/38833 | 4/1997 | WIPO . |

*Primary Examiner*—Sam Chuan Yao
*Attorney, Agent, or Firm*—Neil Teitelbaum & Associates

[57] ABSTRACT

A straw splitter for longitudinally splitting pieces of cereal straw into separated strands for use in making a panel, board or beam is provided. A cutting shear roller and a gripping shear roller are rotatable around their longitudinal axis at different circumferential speeds. The pieces of straw are split due to shear between the cutting shear roller and the gripping shear roller. The shear rollers each comprise parallel grooves with cutting edges oriented at a predetermined angle to the roller axis such that the grooves of the gripping shear roller cross the grooves of the cutting shear roller providing a scissoring action for splitting the straw into long strands.

17 Claims, 16 Drawing Sheets

| | CSA437 OSB-2 req. | OSSB (ord.Wheat) | OSSB (sol.stem W) | | CSA437 R-1 req. | ROSSB (ord.Wheat) | ROSSB (sol.stem W) |
|---|---|---|---|---|---|---|---|
| MOE-Paral (MPa) | 5500 | 6900 | 7700 | | 3100 | 4600 | 5300 |
| MOE-Perp (MPa) | 1500 | 2800 | 3000 | | 3100 | 4600 | 5000 |

DEVICE FOR LONGITUDINALLY SPLITTING PIECES OF STRAW INTO SEPARATED STRANDS

This is a continuation in part of U.S. application Ser. No. 09/119,041 in the name of Bach et al. filed on Jul. 20, 1998.

FIELD OF THE INVENTION

This invention relates generally to a device for splitting straw, and more particularly to a device for splitting pieces of straw longitudinally into long separated strands for making a structural panel, board or beam.

BACKGROUND OF THE INVENTION

In the past, straw was not considered a suitable structural material. Unlike wood, straw has not been considered for its strength and has not commonly been considered as a building material. Current trends in the use of straw for construction involve straw bales where dense packing and size provide necessary strength and structural support. Straw represents a vast source of fibre that, when properly processed, has economic potential as a substitute for wood in structural applications.

In the description that follows the term cereal straw is to encompass other lignocellulosic material that is cereal straw-like in structure, such as rice straw and bamboo. Heretofore a thin panel of compressed non-woody lignocellulosic material (i.e. straw) has been made by mixing short straw pieces with a binder. Disclosure of this thin panel is found in U.S. Pat. No. 5,498,469 in the name of Howard et al. issued Mar. 12, 1996, incorporated herein by reference. The panel is used as a core layer or core stock in a plywood laminate; thus a thin layer of straw panel, is sandwiched between two layers or sheets of plywood. Although this thin panel ~0.10 inches appears to perform its intended function, the thin panels do not have sufficient strength as structural boards. The panels were incorporated with stronger wood laminate layers for the production of plywood.

Other references relating to fiber panel methods of manufacture and devices for making such panels are: U.S. Pat. No. 5,730,830 in the name of Hall, issued Mar. 24, 1998; U.S. Pat. No. 5,729,936 in the name of Maxwell, issued Mar. 24, 1998; and, U.S. Pat. No. 5,728,269 in the name of Kohno et al., issued Mar. 17, 1998.

Inventor discloses in patent application Ser. No. 09/119,041 that the straw strands have to be split into longitudinal pieces, to ensure that the exterior and interior surfaces of the hollow straw stem core are coated with a binder prior to hot pressing in order to obtain maximum strength. To increase bending strength and stiffness the strands have to be oriented such that the straw strands are substantially parallel. Furthermore, bending strength and stiffness increases substantially with the length of the split straw strands.

Available prior art devices such as a grain roller mill, a ringflaker or a hay macerator may be used for splitting the straw. Unfortunately, these devices do not produce split straw strands necessary for making a structural panel, board or beam out of straw that meets requirements concerning strength and stiffness. The split straw strands are mostly short or the straw has not been split adequately such that the strands are not separated making it difficult or even impossible to orient the strands. In U.S. Pat. No. 5,236,319 in the name of von Allworden et al. issued Jul. 5, 1994, a device for preparation of straw materials is disclosed. With this device mowed straw material is broken up into fibers by feeding it into a clearance zone between planetary rolls and a central roll, in order to speed up the drying process. Unfortunately, this device does not split the straw into separated strands necessary for aligning the split straw strands. In U.S. Pat. No. 5,119,562 in the name of Dietz issued Jun. 9, 1992, a hand tool for splitting straw into strips is disclosed. Although, the device produces long separated split straw strands it is not feasible for use in manufacturing structural panels out of straw. The device allows processing of only one piece of straw at a time and is only useful for producing a straw mesh or wickerwork by hand.

It is an object of this invention, to provide a device for splitting longitudinally pieces of cereal straw into long separated strands for use in making a panel, board or beam.

It is another object of this invention to provide a device for aligning the split straw strands.

SUMMARY OF THE INVENTION

In accordance with the invention there is provided a straw splitter for longitudinally splitting pieces of cereal straw into long separated strands. A cutting shear roller and a gripping shear roller are rotatable around their longitudinal axis at different circumferential speeds. The pieces of straw are split due to shear between the cutting shear roller and the gripping shear roller. The shear rollers each comprise parallel grooves with cutting edges oriented at a predetermined angle to the roller axis such that the grooves of the gripping shear roller cross the grooves of the cutting shear roller providing a scissoring action for splitting the straw into long strands.

In accordance with the invention there is provided a device for longitudinally splitting pieces of cereal straw into separated strands comprising:

a gripping mechanism movable at a predetermined speed for gripping and transporting pieces of straw, the pieces of straw being aligned such that their longitudinal axes are substantially parallel;

a cutting mechanism having cutting edges, the cutting mechanism being movable at a substantially higher speed than the gripping mechanism and the cutting edges being oriented at a predetermined angle to cross the longitudinal axis of the pieces of straw for providing a scissoring action upon the pieces of straw for longitudinally splitting the same;

a holding mechanism for holding the gripping mechanism and the cutting mechanism in a predetermined position to each other having a predetermined clearance therebetween; and, a drive mechanism for moving the gripping and the cutting mechanism at substantially different speeds.

In accordance with the invention there is further provided a device for longitudinally splitting pieces of cereal straw into separated strands for use in making a panel, board or beam, comprising:

a gripping shear roller rotatable around its longitudinal axis in a predetermined direction of rotation and at a predetermined circumferential speed for gripping and transporting pieces of straw, the gripping shear roller having parallel grooves oriented at a predetermined angle from the roller axis;

a cutting shear roller rotatable around its longitudinal axis in opposite direction and at a predetermined circumferential speed substantially higher than the circumferential speed of the gripping shear roller for longitudinally splitting the pieces of straw, the cutting shear roller having parallel grooves with cutting edges oriented at a predetermined angle from the roller axis such that the parallel grooves of the cutting shear roller cross the grooves of the gripping shear roller to provide a scissoring action;

a supporting bench for rotatably holding the cutting shear roller;

a supporting arm pivoted to the supporting bench for rotatably holding the gripping shear roller at a predetermined clearance parallel to the cutting shear roller; and, a variable-speed electric motor driving the cutting shear roller and the gripping shear roller using V-belts and drive chains.

In accordance with another embodiment according to the invention there is provided a device for longitudinally splitting pieces of cereal straw into separated strands for use in making a panel, board or beam, comprising:

a first cutting stage for longitudinally splitting pieces of straw comprising:

a first gripping shear roller rotatable around its longitudinal axis in a predetermined direction of rotation and at a predetermined circumferential speed for gripping and transporting pieces of straw, the gripping shear roller having parallel grooves oriented at a predetermined angle from the roller axis;

a first cutting shear roller rotatable around its longitudinal axis in opposite direction and at a predetermined circumferential speed substantially higher than the circumferential speed of the gripping shear roller for longitudinally splitting the pieces of straw, the cutting shear roller having parallel grooves with cutting edges oriented at a predetermined angle from the roller axis such that the parallel grooves of the cutting shear roller cross the grooves of the gripping shear roller to provide a scissoring action;

a second cutting stage for longitudinally splitting split straw strands received from the first stage comprising:

a second gripping shear roller rotatable around its longitudinal axis in a predetermined direction of rotation and at a predetermined circumferential speed for gripping and transporting split straw strands received from the first stage, the gripping shear roller having parallel grooves oriented at a predetermined angle from the roller axis;

a second cutting shear roller rotatable around its longitudinal axis in opposite direction and at a predetermined circumferential speed substantially higher than the circumferential speed of the gripping shear roller for longitudinally splitting the split straw strands received from the first stage, the cutting shear roller having parallel grooves with cutting edges oriented at a predetermined angle from the roller axis such that the parallel grooves of the cutting shear roller cross the grooves of the gripping shear roller to provide a scissoring action;

a supporting bench for rotatably holding the first and second cutting shear roller;

a first supporting arm pivoted to the supporting bench for rotatably holding the first gripping shear roller at a predetermined clearance parallel to the first cutting shear roller;

a second supporting arm pivoted to the supporting bench for rotatably holding the second gripping shear roller at a predetermined clearance parallel to the second cutting shear roller;

a drive mechanism for driving the first cutting stage shear rollers and the second cutting stage shear rollers; and, an inclined bridging plate mounted to the supporting bench for receiving the split straw strands from the first cutting stage and for providing the same to the second cutting stage.

BRIEF DESCRIPTION OF THE DRAWINGS

Exemplary embodiments of the invention will now be described in conjunction with the drawings, in which.

DETAILED DESCRIPTION

Figure 1:
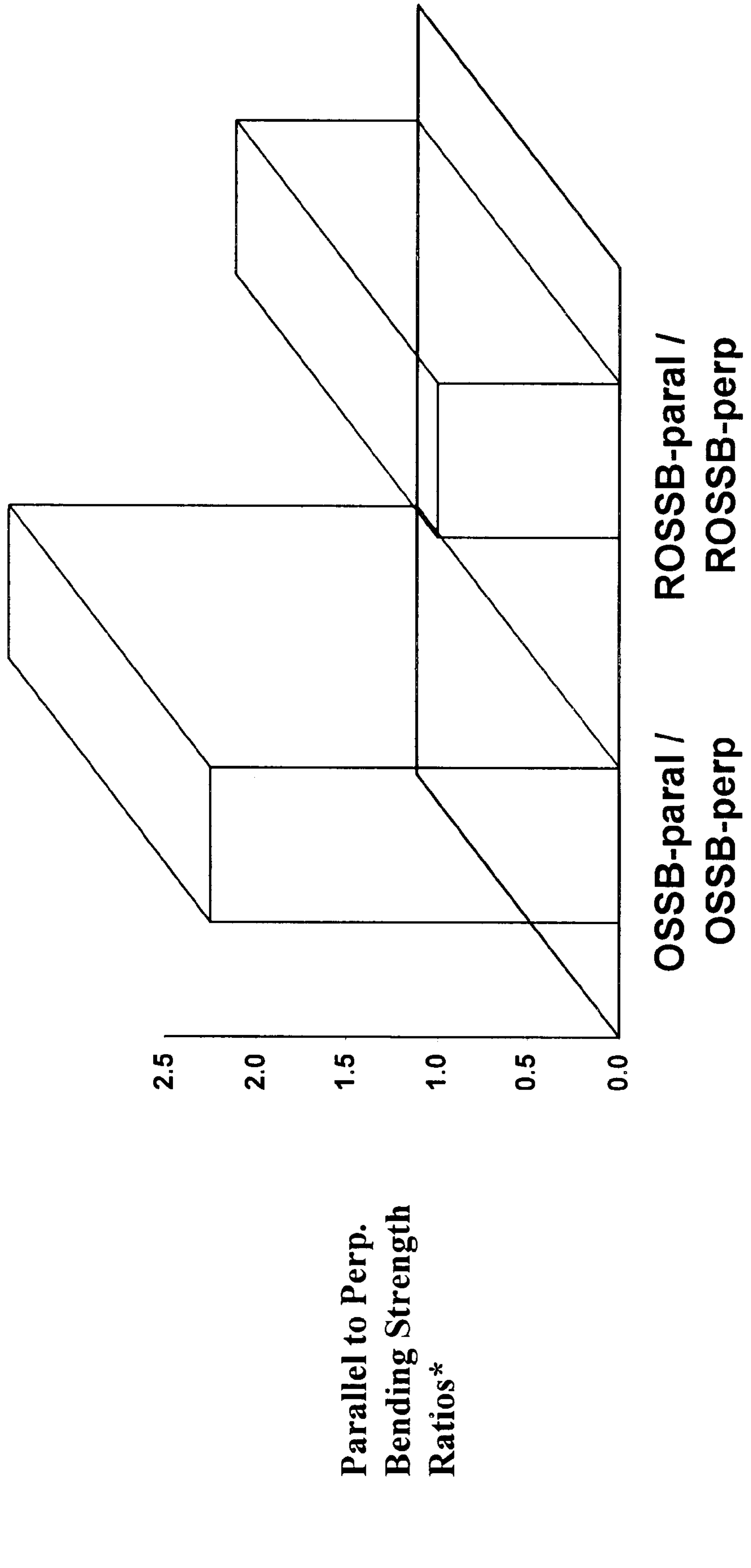
FIG. 1 is a graph comparing the bending strength ratio of a random oriented split straw board (ROSSB) and an oriented split straw board (OSSB)

Referring now to FIG. 1 graphs are shown comparing the bending ratio of a random oriented straw strand board ROSSB and an oriented straw strand board OSSB, wherein orientation of the strands is purposeful, and the strands are oriented so as to be substantially parallel with one another. The relative bending ratio of OSSB to ROSSB in the parallel direction is shown in these figures to be approximately 2:1, but could be as small as 1.05:1.00 and still be useful. The length of the split wheat strands used was 5 mm to 100 mm.

Figure 2:
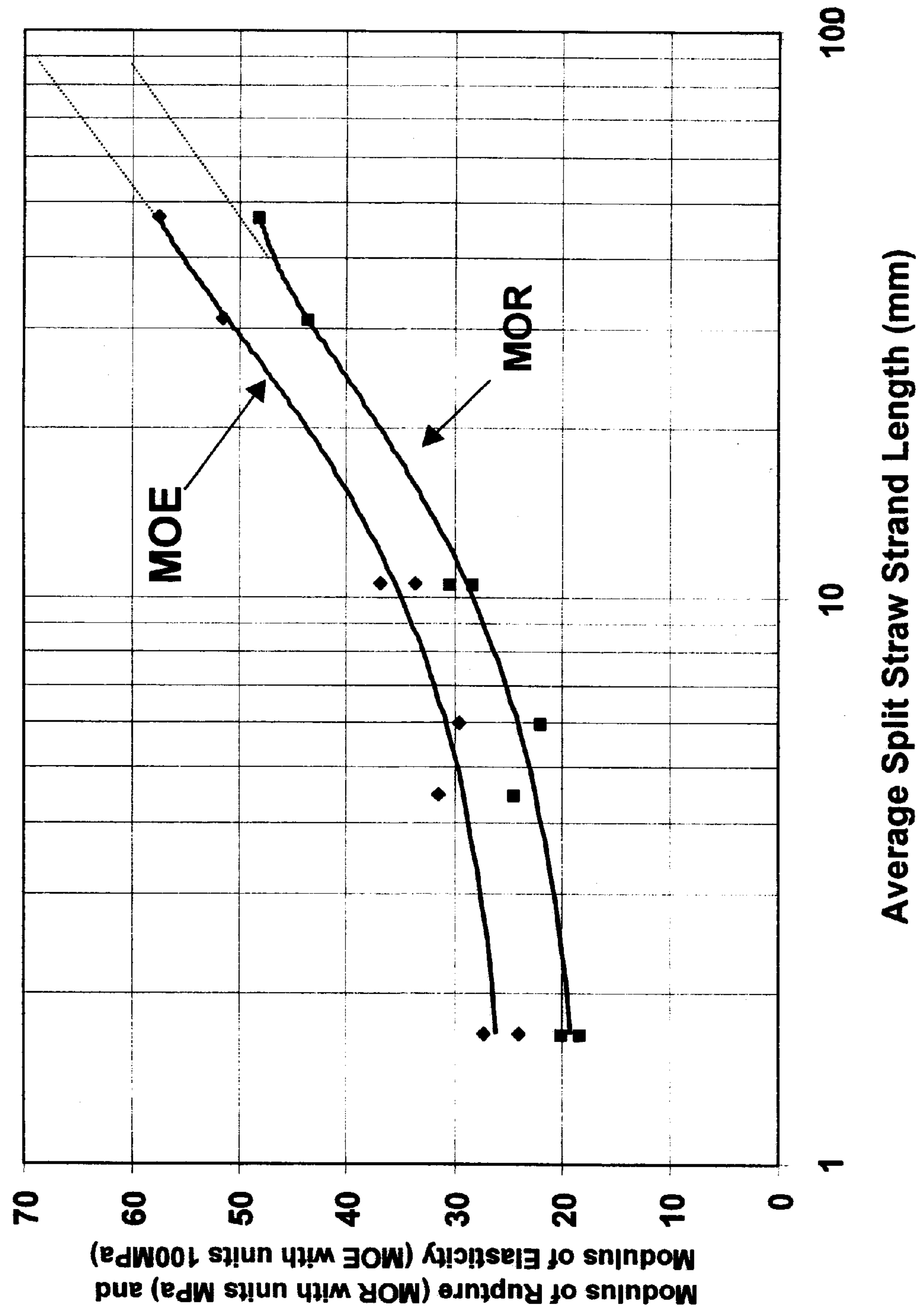
FIG. 2 is a graph of the modulus of rupture, and modulus of elasticity versus the average split straw strand length for ROSSB.

FIG. 2 shows the bending properties of composite straw boards made with different longitudinally split wheat straw strand length. It can be seen that as the length of the straw increases, the bending strength and stiffness increases as well.

Figure 3:
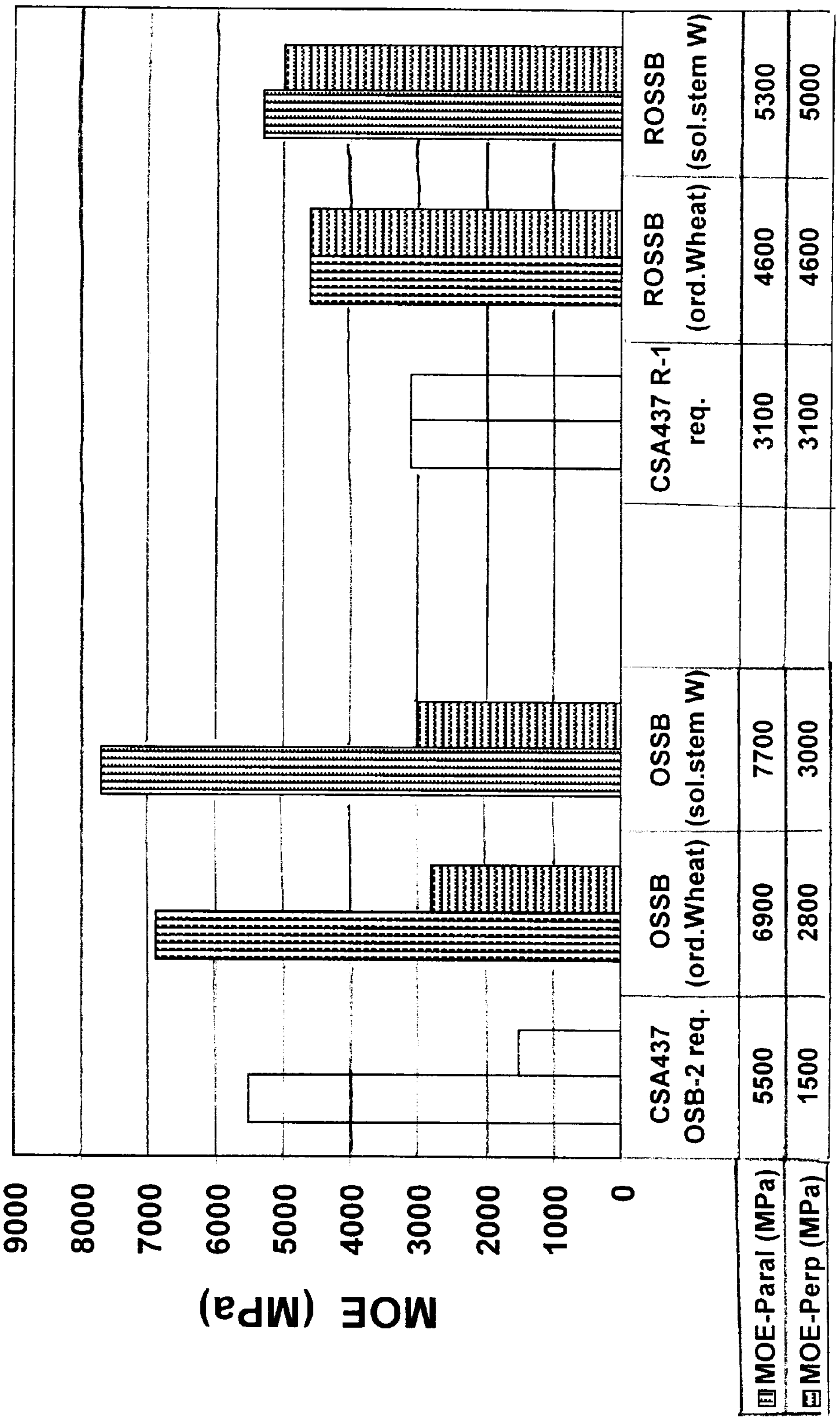
FIG. 3 is a graph depicting the modulus of elasticity of OSSB and ROSSB made from split wheat straw.

FIG. 3 is a graph depicting the modulus of elasticity of OSSB and ROSSB made from split wheat straw, wherein the solid shaded columns illustrate the minimum property requirement in the Canadian code (CSA 437) for "wood-based" oriented and random oriented sectional panels.

Figure 4:
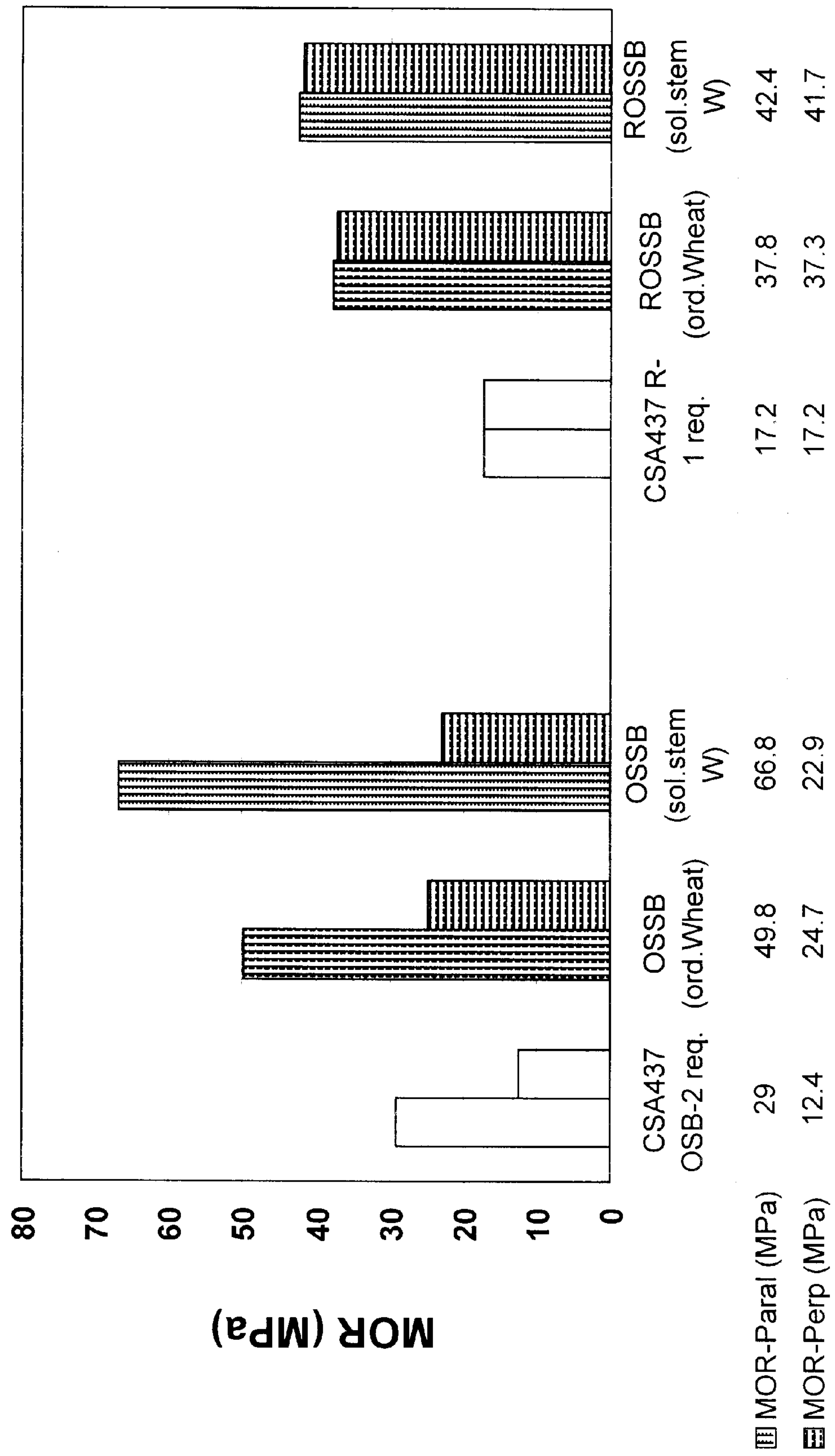
FIG. 4 is a graph depicting the modulus of rupture of OSSB and ROSSB made from split wheat straw.

FIG. 4 is a graph depicting the modulus of rupture of OSSB and ROSSB waferboard made from split wheat straw, wherein the solid shaded columns illustrate the minimum property requirement in the Canadian code (CSA 437) for "wood-based" oriented and random oriented sectional panels.

Figure 5:
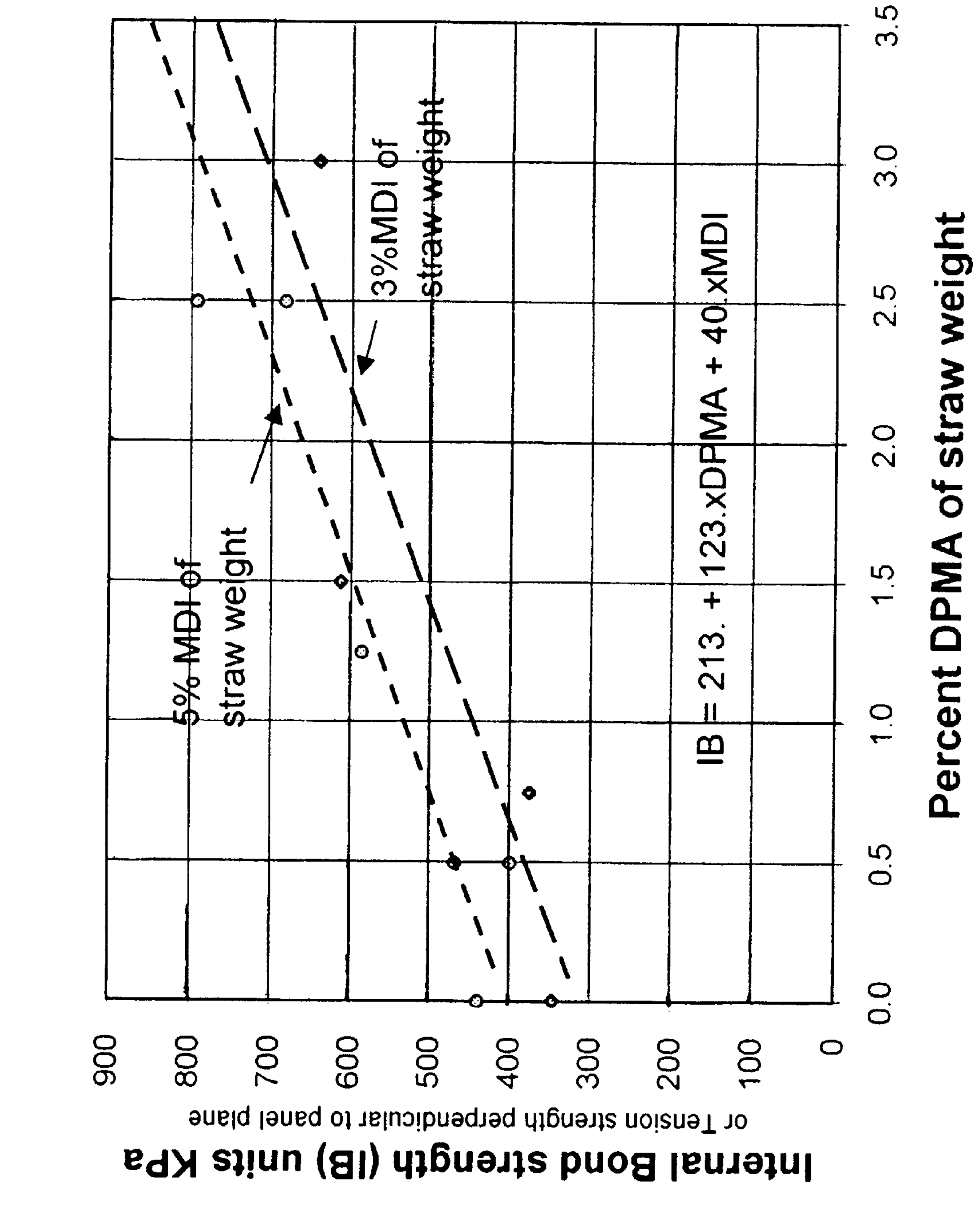
FIG. 5 is a graph depicting internal bond strength of straw panels bonded with MDI resin extended with DPMA.

FIG. 5 is a graph depicting internal bond strength of straw panels bonded with MDI resin extended with DPMA.

In order to obtain maximum strength, the straw should be split, to ensure that the exterior and interior surfaces of the hollow straw stem core can be coated with a binder prior to hot pressing.

In addition to splitting the straw, it can be treated in such a manner as to at least partially strip the wax on the waxy outside stem by using a solvent. After removing the wax and splitting the straw, it becomes easier to glue and requires less glue to be used. More importantly, the finished board has greater internal bond strength. The preferred binder is MDI Isocyanate resin such as ICI's "Rubinate 1840", or Dow's "PAPI-94". Phenolic resin normally used for wood panel does not bond well to straw.

The panel, board, or beam consists essentially of longitudinal split straw and resin binder such as MDI, wherein the straw has been oriented such that the longitudinal axes of the straw pieces are substantially parallel. It has been found that the use of DPMA (DOWANOL™) extends the coverage of MDI applied.

In another embodiment, an oriented straw panel comprised of cementitious materials up to 50% (by weight), has been made. This embodiment has the advantage of providing a high degree of fire resistance combined with mechanical properties that exceeds the minimum strength requirement for wood based structural panels.

Figure 6:
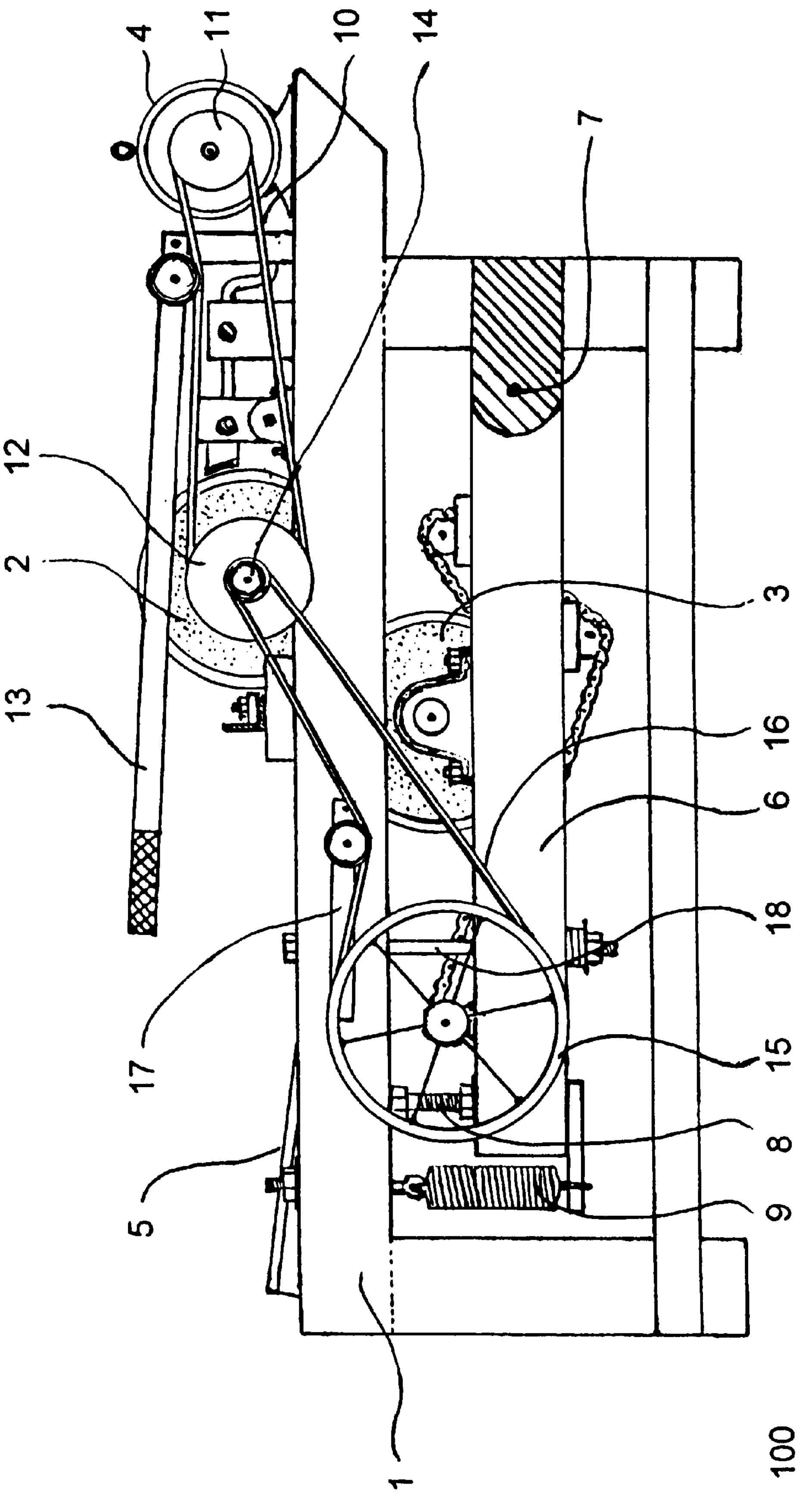
FIG. 6 illustrates a side view of a straw splitter according to the invention.

Referring to FIG. 6, a side view of a device 100 for longitudinally splitting straw for use in making a panel, board or beam according to the invention is shown. The device 100 comprises a supporting bench 1, a feed table 5 and two machine grooved shear rollers 2 and 3 oppositely driven at different rotational speeds by an electric motor 4. The straw is fed generally parallel to the roller axes using the feed table 5 angled downwardly towards the two shear rollers 2 and 3 where it is split longitudinally due to the shear action between the two shear rollers. Of course, alternatively, the roller's diameters can be varied such that they are driven at the same rotational speed but have substantially different circumferential speed. The term circumferential speed is used to indicate that the rollers are of the same size and are driven at different rotational speeds, or that the rollers are of different sizes and are driven at the same or different rotational speeds.

The cutting shear roller 2 is affixed to the supporting bench 1, while the gripping shear roller 3 is affixed to a supporting arm 6 pivoted to the bench 1 at the joint 7. The clearance between the two shear rollers is determined such that split straw strands are transported between the two shear rollers. For splitting different types of straw the clearance is adjusted using an adjustment mechanism comprising an elevating screw 8 and a tension spring 9. Furthermore, this mechanism prevents serious damage in the event that coarse, hard materials inadvertently pass between the rollers. Other embodiments for adjusting the clearance between the two shear rollers may be envisaged, such as a ratchet gear or rack hoisting gear. The adjustment mechanism is also used for lowering the gripping shear roller 3 in case some material is stuck between the shear rollers or for cleaning purposes.

The cutting shear roller 2 is driven counterclockwise at approximately 500 rpm to 1500 rpm by the variable-speed electric motor 4 using a V-belt drive or other such drive means. The V-belt drive comprises a V-belt 10 and V-belt pulleys 11 and 12 being affixed to the axis of the electric motor 5 and the cutting shear roller 2 respectively. The V-belt 10 is tightened using the primary tension lever 13. For overload protection of the electric motor 4 the V-belt pulley 11 comprises an overload clutch such as a slipping clutch. An emergency shut off is preferably also included.

Both shear rollers are made of hardened steel as a hollow cylinder of approximately 500 mm to 2000 mm in length and 200 mm to 800 mm in diameter. The shear roller surfaces comprise parallel cutting edges oriented at angles between 0° to 45° to the shear roller axis, seen in FIGS. 9 and 11. Cutting edges are machined on the exterior surface of the cylinders.

The gripping shear roller 3 rotates in the opposite direction to the cutting shear roller 2 at a substantially lower speed, i.e. approximately 50 rpm to 150 rpm. In order to reverse the direction of rotation and to reduce the speed a chain sprocket drive is used. The first portion of the drive comprises a V-belt pulley 14 affixed to the axis of the cutting shear roller, a V-belt pulley 15 affixed to the axis of the gripping shear roller and a V-belt 16. To reduce the speed the driving V-belt pulley 14 has a substantially smaller diameter than the driven V-belt pulley 15. The V-belt 16 is tightened using the secondary tensioning lever 17.

Figure 7:
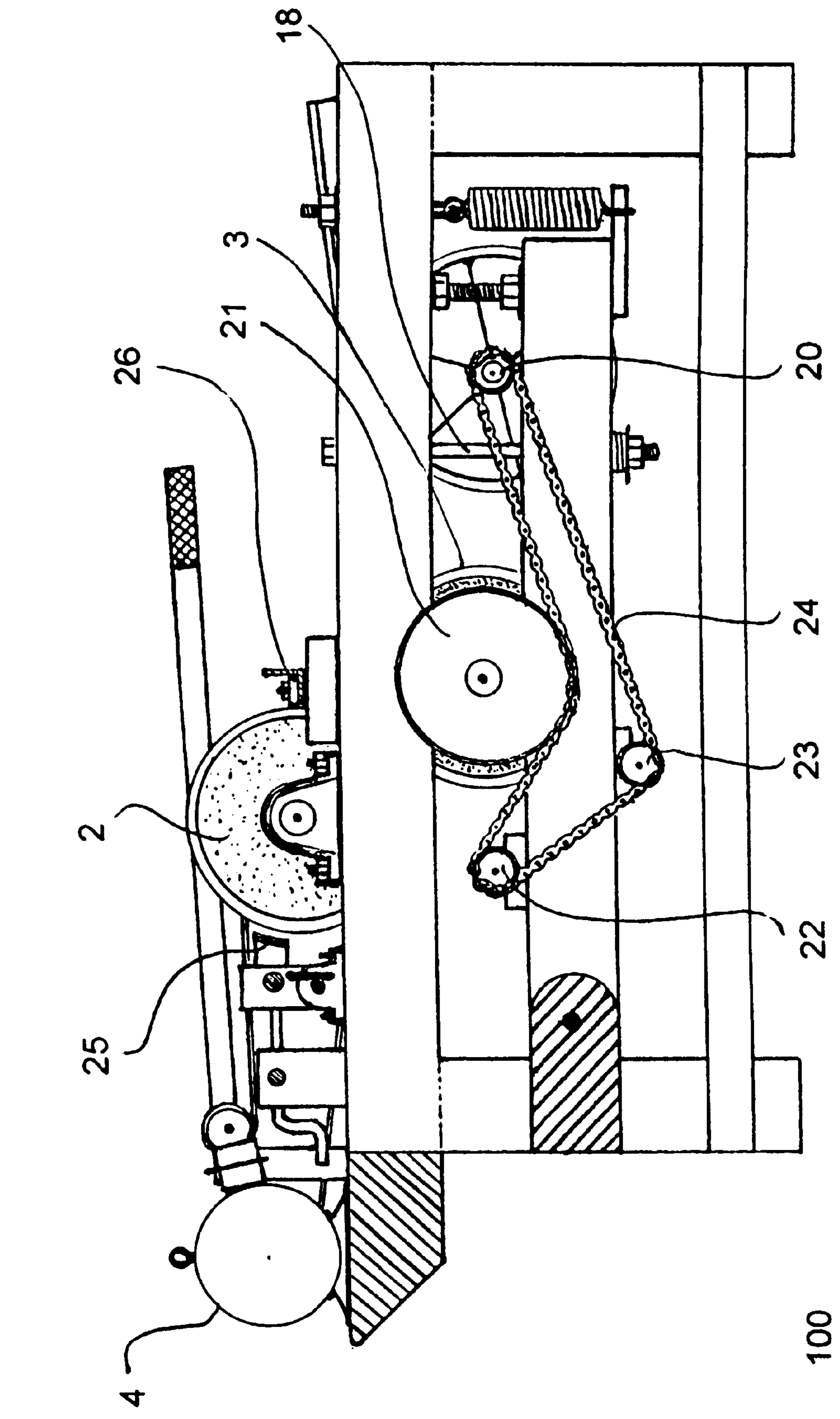
FIG. 7 illustrates a side view of the opposite side of the straw splitter according to the invention shown in FIG. 6.

Referring to FIG. 7 the opposite side view of the device 100 is shown. The second portion of the drive comprises a sprocket 20 affixed to an axis driven by the V-belt pulley 15, a sprocket wheel 21 affixed to the axis of the lower shear roller and two supporting sprocket wheels 22 and 23. To further reduce the speed the driving sprocket wheel 20 has a substantially smaller diameter than the driven sprocket wheel 21. In order to reverse the direction of rotation the chain 24 is driven by the sprocket wheel 20 on its inside and drives the sprocket wheel 21 on its outside. The sprocket wheel 22 ensures the contact between the chain 24 and a substantial part of the circumference of the sprocket wheel 21, whereas the sprocket wheel 23 keeps the lower portion of the chain 24 from contacting the upper portion.

There are numerous other embodiments for driving the two shear rollers in opposite directions and at different speeds such as: a chain drive directly driven by the electric motor; two mating gears; two smaller electric motors each driving one shear roller using a V-belt drive; two smaller electric motors each driving directly one shear roller axis using a jaw clutch; or other arrangements obvious to persons of skill in the art.

Two shear rollers having a substantially different diameter may be used to ensure the different relative circumferential velocities of the shear rollers driven with the same rotational speed. Because the relation of the two diameters is directly proportional to the relation of the two surface speeds needed for the shear action this embodiment is limited by the feasibility of the combination of shear rollers with large differences in diameter.

Figure 8:
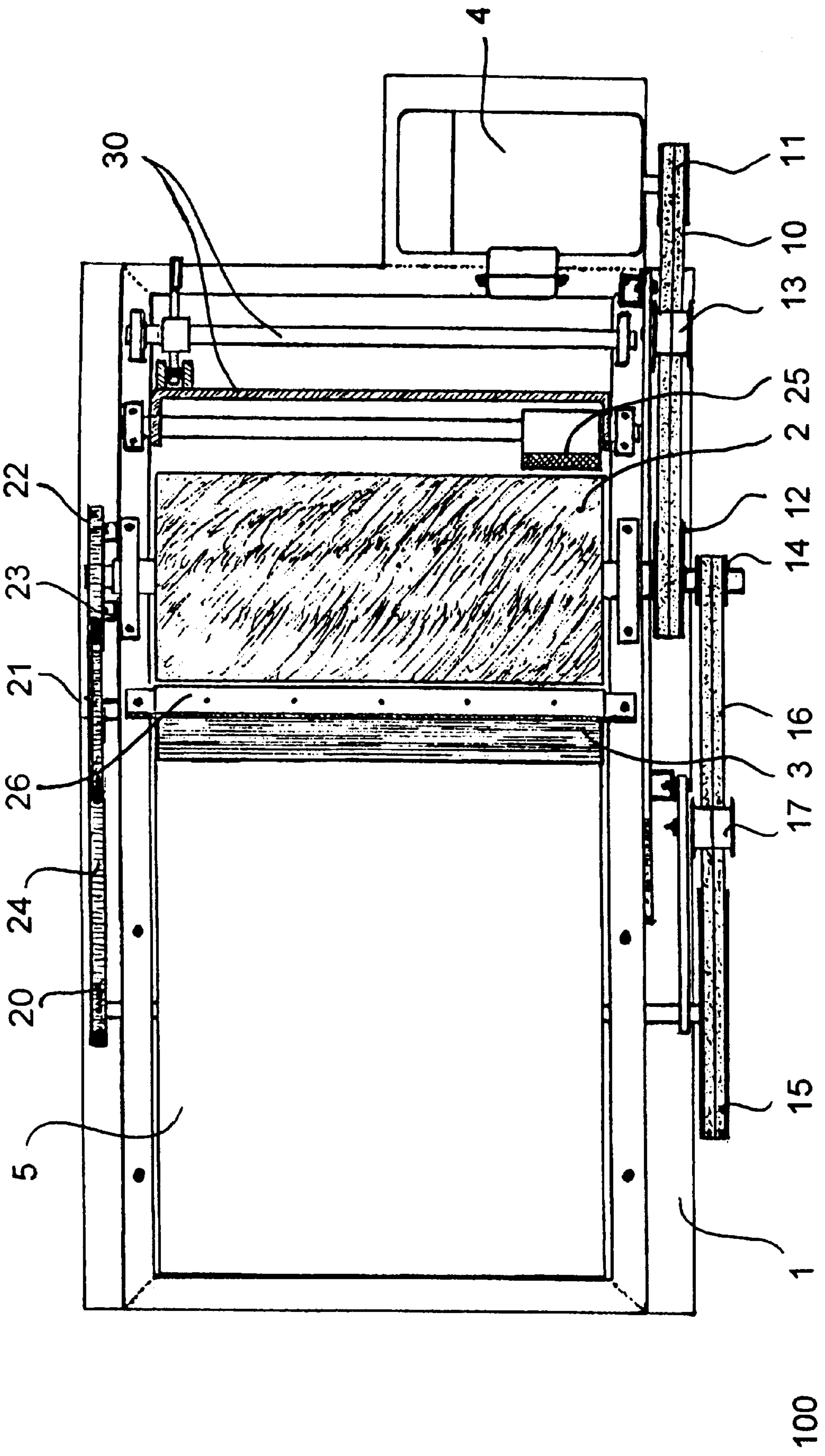
FIG. 8 illustrates a plan view of the straw splitter according to the invention shown in FIG. 6.

Referring to FIG. 8 a plan view showing the top of the device 100 is shown. The feed table 5 is angled downwardly ending at the gripping shear roller 3, which then transports the straw to the cutting shear roller 2 for splitting. Seen more clearly in FIGS. 6 and 7, the feed table 5 is supported by a linkage 18 to the support arm 6 to follow the gripping shear roller 3 through all height adjustments. Seen more clearly in FIG. 9, the feed table 5 is directed towards the surface of the gripping shear roller 3 ending very close to it for depositing the straw on the shear roller surface. The two shear rollers 2 and 3 are driven by the electric motor 4 using the V-belt drives on the one side of the device 100 and the chain drive on the other side. The cutting edges of the cutting shear roller 2 are sharpened as required by holding a grind stone 25 to the surface of the cutting shear roller 2 as it rotates in a direction opposite to which it is used. The grind stone 25 is advanced longitudinally using the adjustment mechanism 30 to contact and sharpen the cutting edges 41 along the full length of the shear roller 2. Sharpening of the gripping shear roller is achieved by moving the sharpening assembly 25, 30 to the opposite side of the roller 2 on the underside of the supporting bench 1.

In front of the cutting shear roller 2 a turbulence control mechanism comprising a ledge 26 having the length of the cutting shear roller is affixed to the supporting bench 1. This ledge 26 assists in preventing the straw from being unduly blown about.

Figure 9:
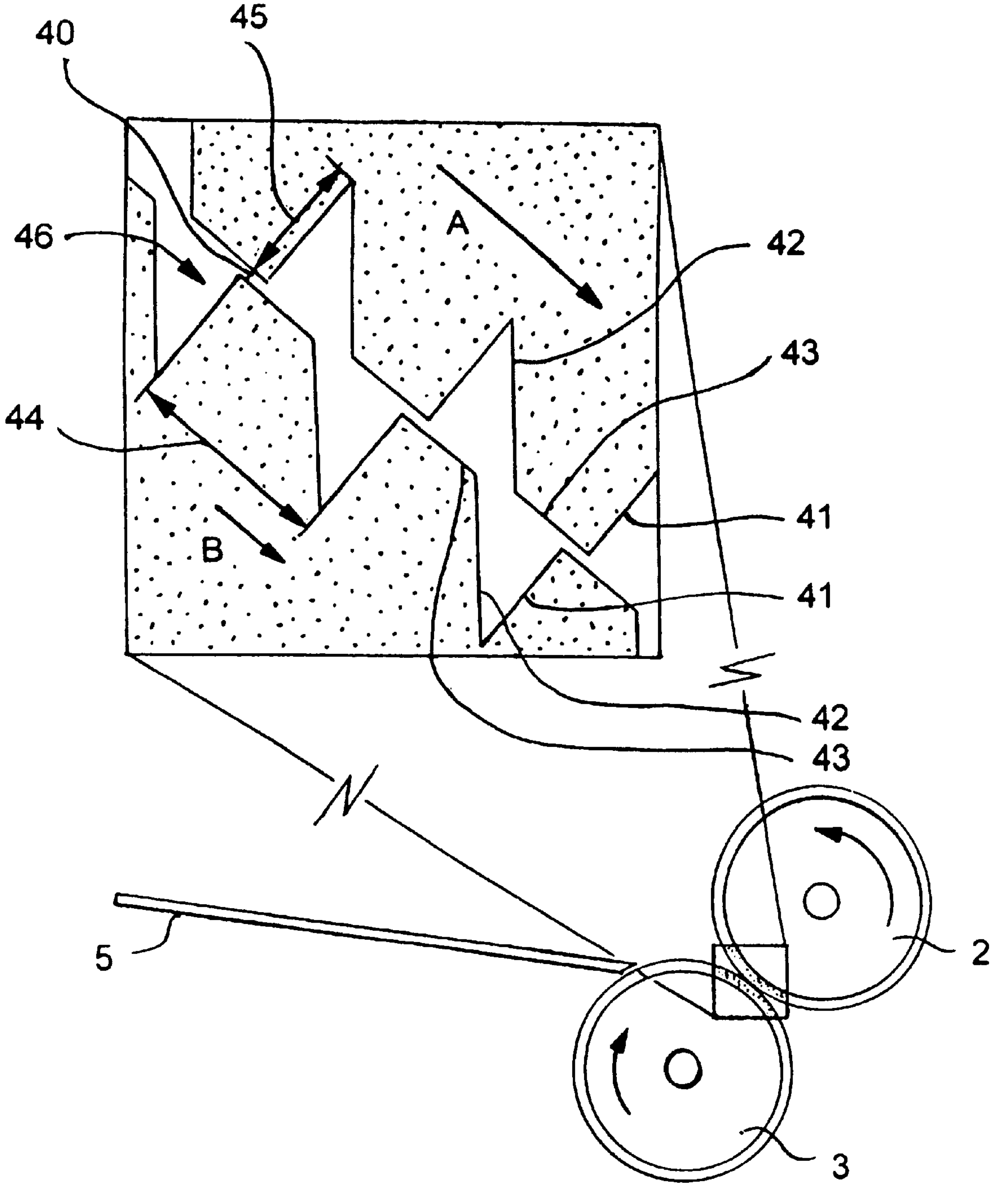
FIG. 9 illustrates a detailed view of the surface structure of the shear rollers shown in FIG. 6.

FIG. 9 shows a detailed view of the surface structure of the two shear rollers 2 and 3 rotating in opposite direction at different speeds. The straw is fed generally parallel to the axes of the shear rollers using the feed table 5. The area where the two shear rollers are closest together is enlarged to show the surfaces in detail. The clearance 40 between the two shear rollers is approximately 0.1 mm to 0.3 mm. Both shear rollers have parallel grooves 46 cut in their surfaces. These grooves have a triangular shape comprising a cutting edge 41 normal to the circumference of the shear rollers whereas the opposite side 42 is at an angle of 45° to the surface of the plateau ridge 43. The groove spacing 44 is about 1.5 mm and the groove depth 45 is approximately 0.5 mm to 1.5 mm. The groove spacing 44 and the groove depth 45 are dimensioned such that they are smaller than an unsplit piece of straw to ensure that substantially all the straw is split. The grooves 46 on shear roller 2 are arranged at an angle to the grooves 46 on shear roller 3. Numerous different shapes of the grooves may be envisaged such as the opposite side 42 of the cutting edge 41 being at an angle to the surface other than 45° or being curved. Alternatively the cutting edge 41 may have a different angle to the surface or be curved. The various shapes may also be combined differently for the two shear rollers. The cutting edge 41 of the cutting shear roller 2 faces in the direction of the rotation, indicated by arrow A, and moves at about ten times the speed of the cutting edge 41 of the gripping shear roller 3 which faces against the direction of the rotation, indicated by arrow B, of the lower shear roller 3. Alternatively, the gripping shear roller 3 comprises grooves without cutting edges or just a rough surface to provide enough resistance for transporting and splitting the pieces of straw.

Figure 10:
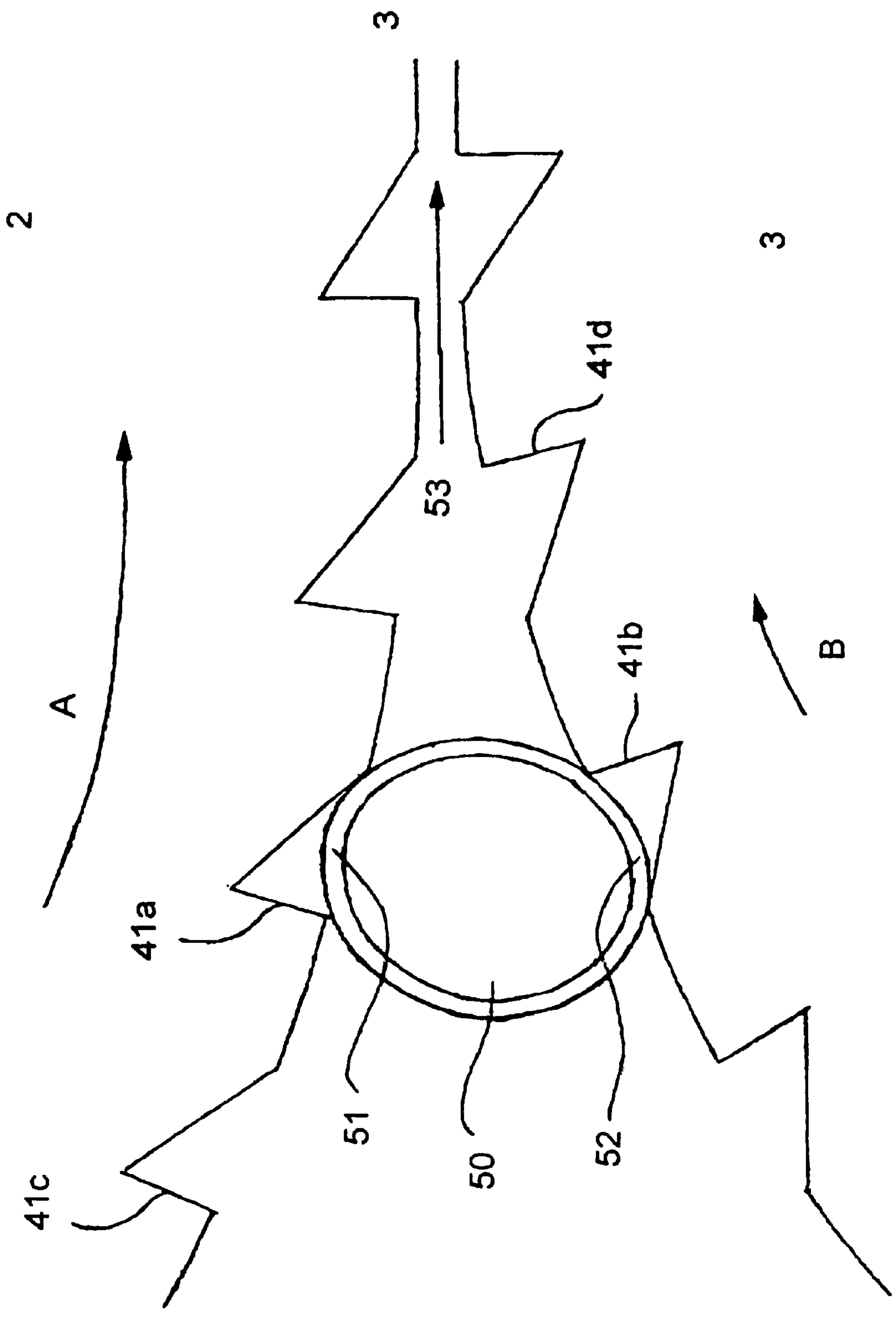
FIG. 10 illustrates the splitting process of the straw splitter according to the invention.

FIG. 10 shows an unsplit piece of straw 50 after being fed on the gripping shear roller and being transported towards the opening 53 between the two shear rollers. The lower portion of the straw is sitting in a groove 46 of the gripping shear roller 3, while the upper portion is caught by the cutting edge 41 of the cutting shear roller 2. Due to the different orientation of the cutting edges and the different speed of the shear rollers the straw 50 is caught by the two cutting edges 41*a* and 41*b*. Consequently an upper portion 51 of the straw is cut off by the cutting edge 41*a* due to the shear action between the two cutting edges 41*a* and 41*b*. The remaining part of the straw 50 is further transported towards the opening 53 and is then caught by the cutting edge 41*c*. When the lower portion 52 of the straw 50 is cut off the remaining part of the straw 50 is then caught by the cutting edge 41*d*. This process is repeated until the straw 50 has passed through the opening 53 between the two shear rollers 2 and 3. The split straw strands are transported through the opening 53 and then released.

Figure 11:
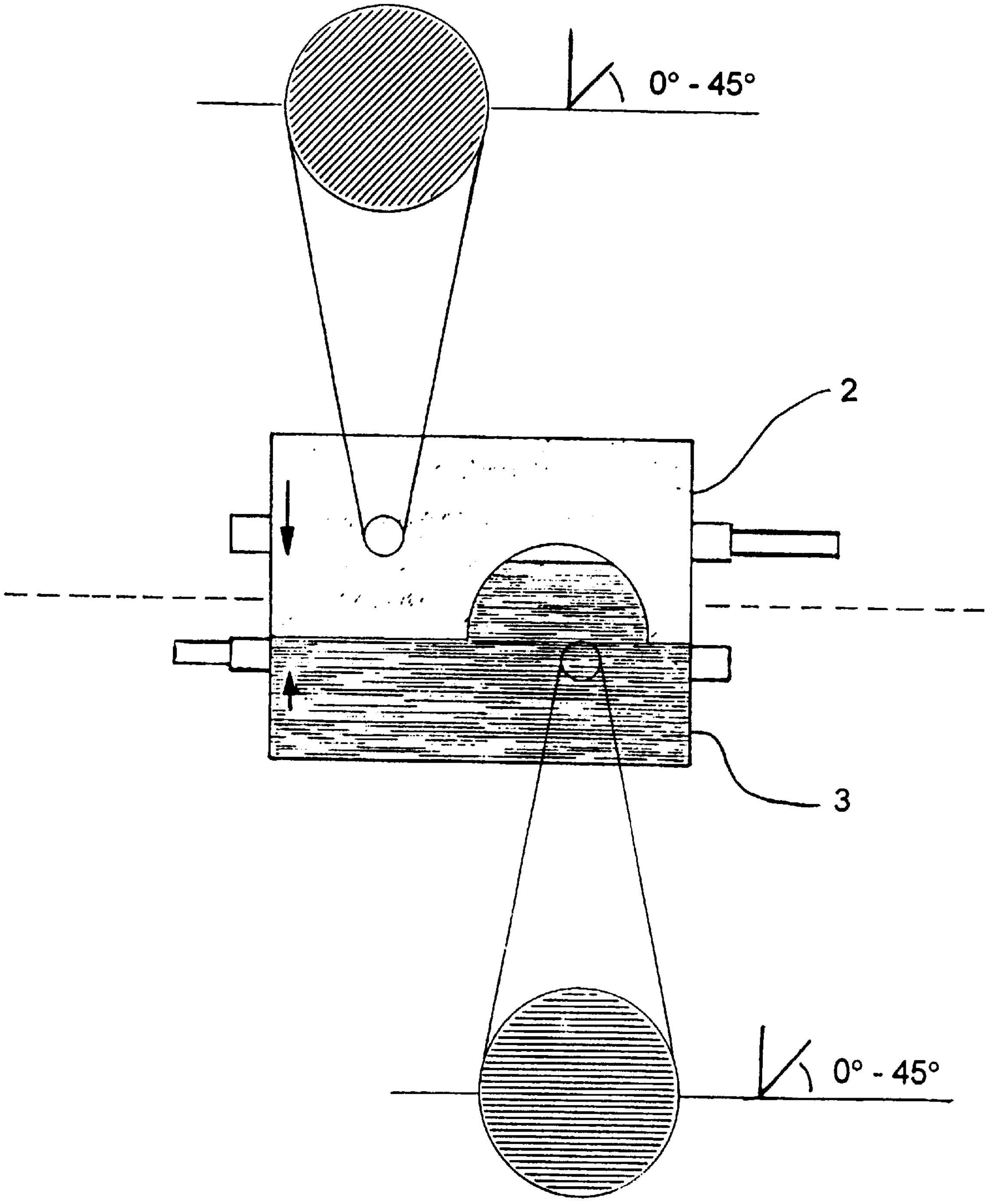
FIG. 11 illustrates the groove orientation on the surface of the shear rollers shown in FIG. 6.

FIG. 11 shows the orientation of the parallel grooves on the surface of the shear rollers. The grooves are oriented between 0° and 45° to the shear roller axis. Having a different orientation of the cutting edges for the gripping shear roller 3 and the cutting shear roller 2 ensures a scissoring action to split the pieces of straw longitudinally. Advantageously, this provides long split straw strands. FIG. 11 shows cutting edges parallel to the roller axis for the gripping shear roller 3 to transport the straw 50 and cutting edges at an angle of 45° to the roller axis for the cutting shear roller 2 to ensure a scissoring longitudinal cut. Grooves 46 parallel to the gripping shear roller axis 3 allow the straw 50 which is generally aligned parallel to the shear roller axes to be transported in the grooves 46 of the gripping shear roller 3 without losing their orientation. The straw is arranged for cutting supported on its whole length by the cutting edge 41*b*. The straw 50 is then split by the cutting edges of the cutting shear roller 2. Less force is needed for cutting the straw 50 if the cutting edge is at an angle to the shear roller axis. Cutting edges at an angle of 45° ensure splitting of the straw 50 into long fiber pieces while needing less force which translates into less power needed to drive the shear roller 3. Various different orientations of the grooves may be envisaged comprising any combination of angles between 0° to 45° on each of the rollers as long as the combination ensures that the grooves of the cutting shear roller 2 cross the grooves of the gripping shear roller 3 for scissoring action. A preferred combination is an angle of 45° for the cutting shear roller 2 and an angle of 30° for the gripping shear roller 3.

Figure 12:
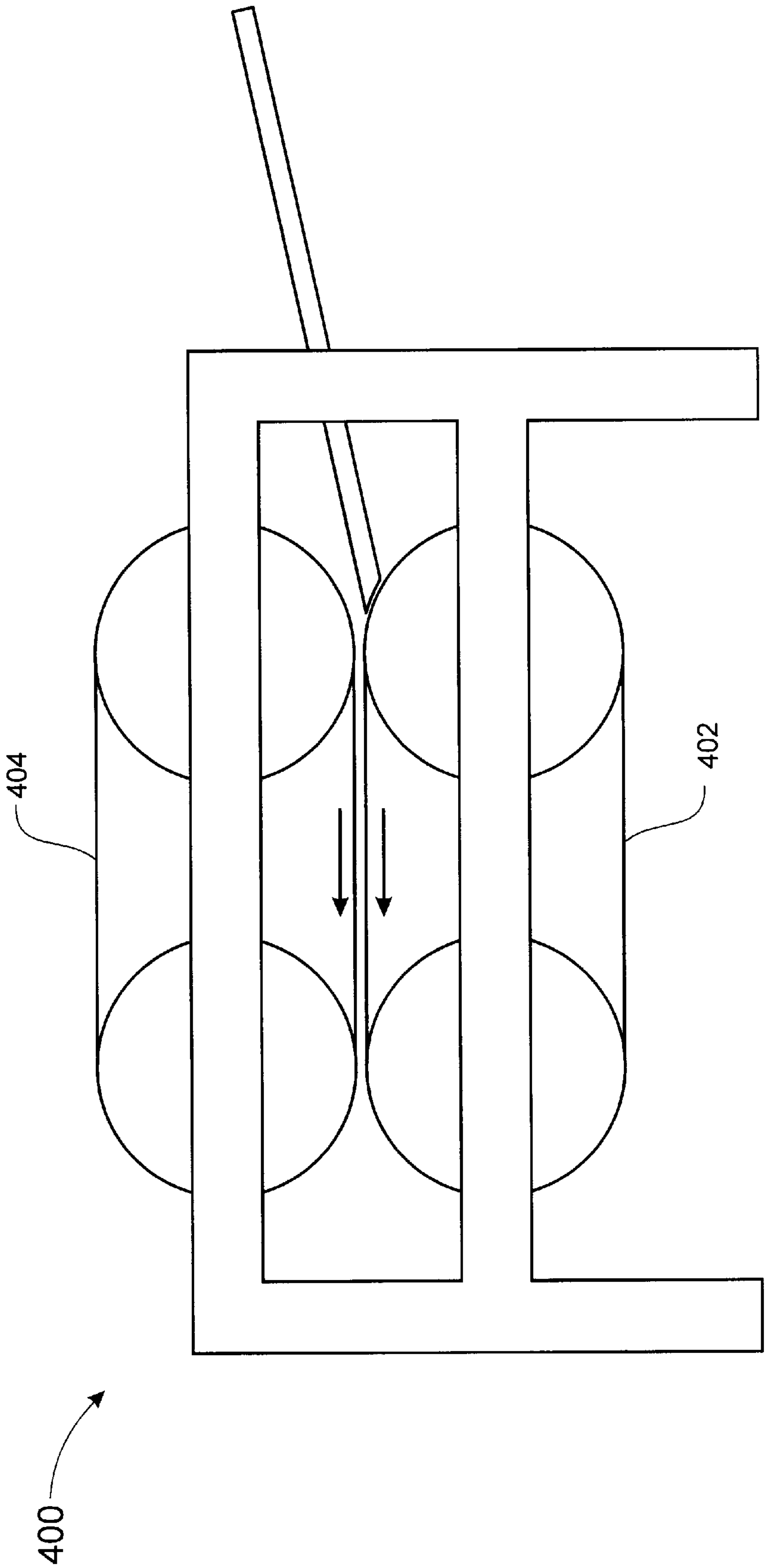
FIG. 12 illustrates a side view of another straw splitter according to the invention.

FIG. 12 shows another embodiment of a straw splitter 400 according to the invention. The gripping shear roller and the cutting shear roller each are replaced by a conveyor belt 402, 404 having grooves at a predetermined angle to the direction of movement. The grooves are oriented such that grooves of the gripping conveyor belt 402 are crossing the grooves of the cutting conveyor belt 404 to ensure scissoring action. The conveyor belts 402, 404 are held in position and driven at substantially different speeds by rollers mounted on a supporting bench. Alternatively, the gripping conveyor belt 402 has a rough surface or a toothed surface to provide enough resistance for transporting and holding the pieces of straw. Further alternatively, a gripping conveyor belt 402 may be combined with a cutting shear roller.

Figure 13:
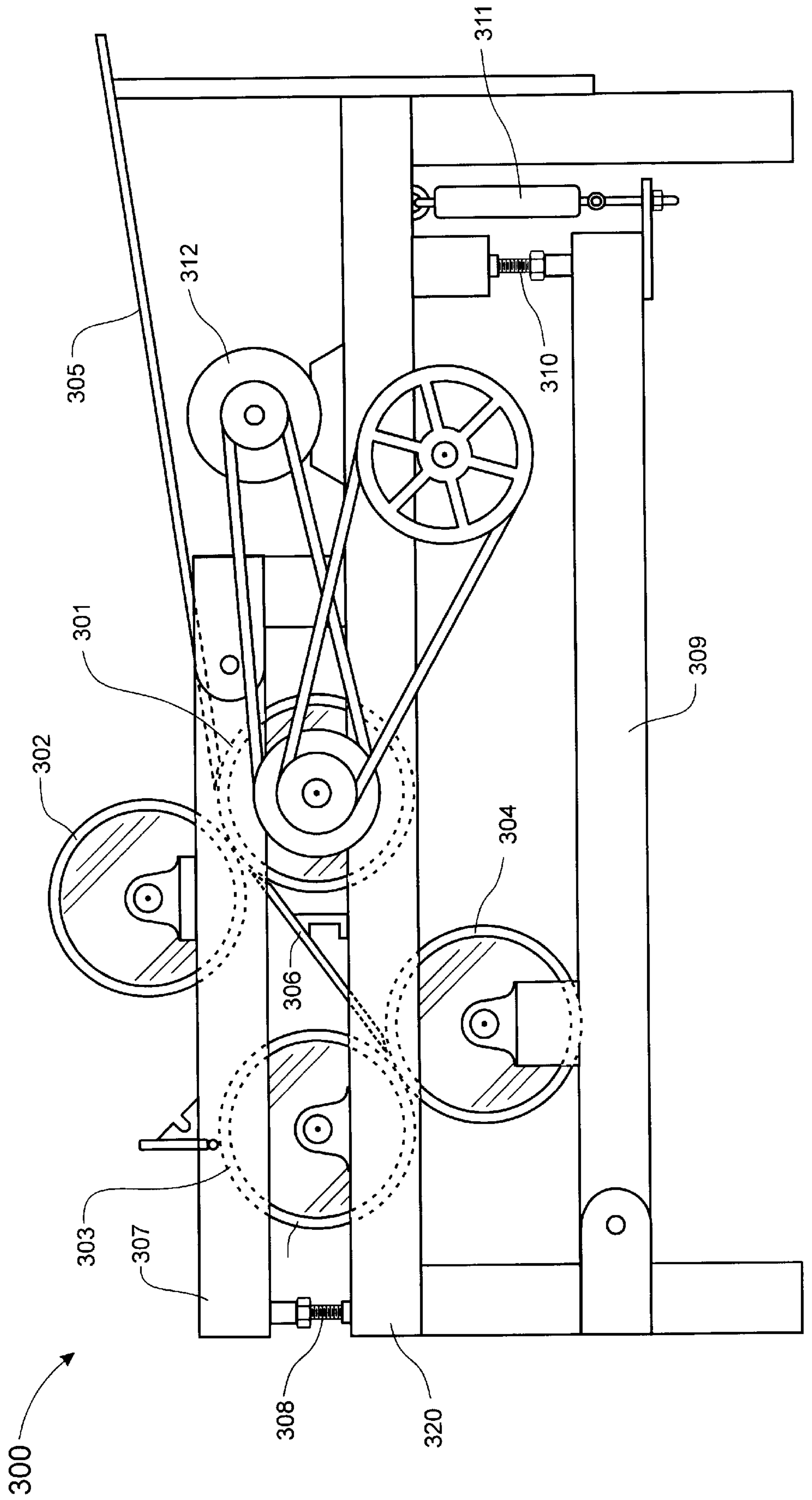
FIG. 13 illustrates a side view of yet another straw splitter according to the invention.

FIG. 13 shows yet another embodiment of a straw splitter according to the invention. The straw splitter 300 comprises two cutting stages. A first cutting shear roller 301 and a first gripping shear roller 302 form a first cutting stage, a second cutting shear roller 303 and a second gripping shear roller 304 form a second cutting stage, respectively. The first cutting shear roller 301 and the second cutting shear roller 303 are each rotatably affixed to a supporting bench 320. The fist gripping shear roller 302 and second gripping shear roller 304 each are rotatably affixed to a supporting arm 307 and 309, respectively. Each supporting arm 307, 309 is pivoted to the supporting bench 320. Clearance between the first cutting shear roller 301 and the first gripping shear roller 302 is adjusted using elevating screw 308, whereas clearance between the second cutting shear roller 303 and the second gripping shear roller 304 is adjusted using elevating screw 310 and tension spring 311. Unsplit pieces of straw are fed substantially parallel to the shear rollers of the first cutting stage via feed table 305. Split straw strands leaving the first cutting stage are then fed via bridging plate 306 to the second cutting stage.

Using two cutting stages allows splitting of pieces of straw into finer strands, that is splitting into strands comprising less fibres. This is more economical than feeding the split straw strands again through the same device in order to obtain finer split straw strands. Finer split straw strands provide a larger surface area with respect to a same amount of fibres. A larger surface area coated with a binder prior to hot pressing increases strength of a such fabricated straw panel.

Another advantage of the two-stage device is that the clearance between the shear rollers can be increased. Increasing the clearance allows to increase the amount of split straw being transported between two shear rollers, thus increasing the amount of straw being processed.

The split straw strands entering the second cutting stage are finer than the straw pieces fed to the first stage. Therefore, it is preferable that the clearance between the second cutting shear roller 303 and the second gripping shear roller 304 is smaller than the clearance between the first cutting shear roller 301 and the first gripping shear roller 302. For the same reason, it may be preferred that the grooves of the shear rollers of the second cutting stage are smaller to ensure further splitting of the split straw strands entering the second stage.

A variable-speed electric motor 312 drives the first cutting shear roller 301, the first gripping shear roller 302 and the second gripping shear roller 304 via V-belt drives and chain drives. A second variable-speed electric motor—not shown in FIG. 12—drives the second cutting shear roller 303 via a V-belt drive. As is obvious to a person of skill in the art, there are numerous possibilities to drive the shear rollers of the two stages, for example, one electric motor driving all shear rollers, one electric motor for each cutting stage or one electric motor for each shear roller.

Figure 14:
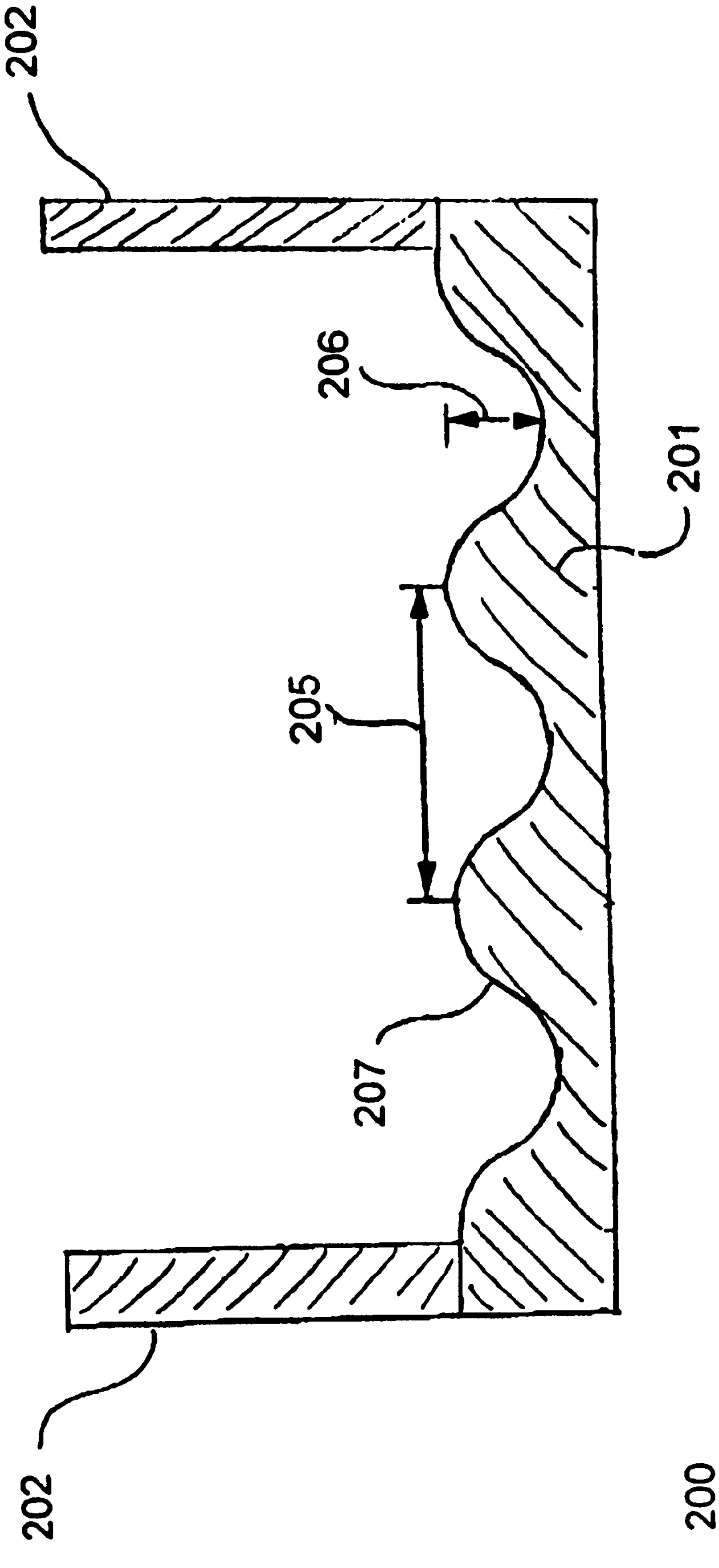
FIG. 14 illustrates a side view of a split straw orienter according to the invention.

Referring to FIG. 14 a side view of a split straw orienter 200 according to the invention is shown. For making a panel, board or beam according to the invention the split straw strands must be aligned prior to pressing. The randomly oriented split straw strands 203 are deposited onto a board 201 having a corrugated surface. The board is vibrated transversely. Due to the vibration the split straw strands are substantially aligned accumulating at the bottom of the grooves. Tilting the board ensures the movement of the split straw strands while being processed.

The split straw orienter 200 as shown in FIG. 14 comprises a board 201 having a corrugated surface and being tilted at an angle of approximately 10° to 45°. The board 201 is sufficiently long to assure proper alignment of the split straw strands, approximately 1500 mm to 4000 mm. Raised lateral edges or walls 202 contain the split straw within the device 200 while being processed. The randomly oriented split straw strands 203 are deposited onto the board 201 at the elevated end. The split straw orienter 200 is vibrated transversely. The transverse vibration may be realized using an electric motor and an eccentric. The aligned split straw strands 204 leave the device 200 at the lower end and may be fed on a transport belt or other means to maintain the alignment.

Figure 15:
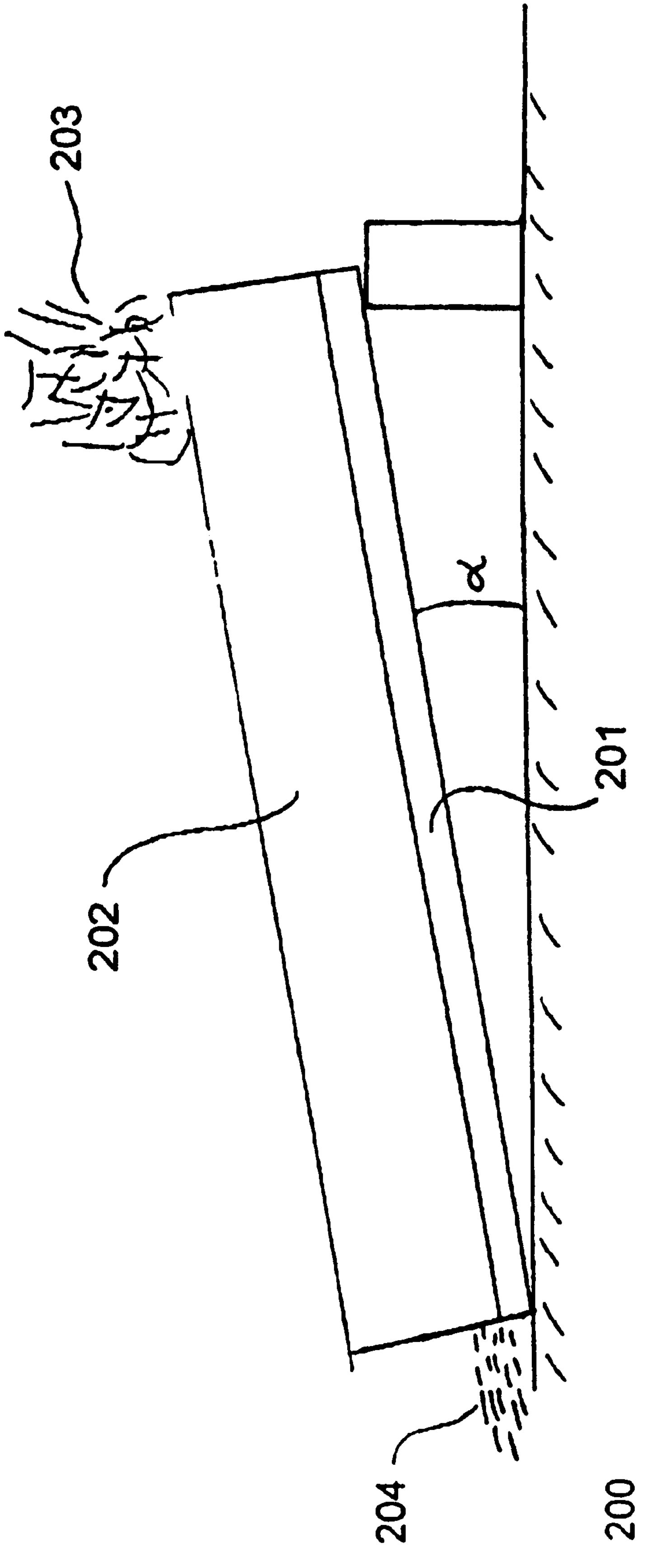
FIG. 15 illustrates a cross sectional view of the split straw orienter according to the invention.

FIG. 15 shows a cross sectional view of the split straw orienter 200. The board 201 comprises a corrugated surface of a sine like shape having a distance 205 between two consecutive ridges of approximately 25 mm to 100 mm and a depth 206 of the grooves of approximately 20 mm to 100 mm. Alternatively, different shapes of the corrugated-like surface may be envisaged such as a triangular shape or spiked/upright walls. Affixed to the board 201 are raised lateral edges or walls 202 to contain the split straw strands within the split straw orienter 200 during the process of aligning the split straw strands. Throughout this specification, the term corrugated should be read and understood to means corrugated or corrugated like.

Figure 16:
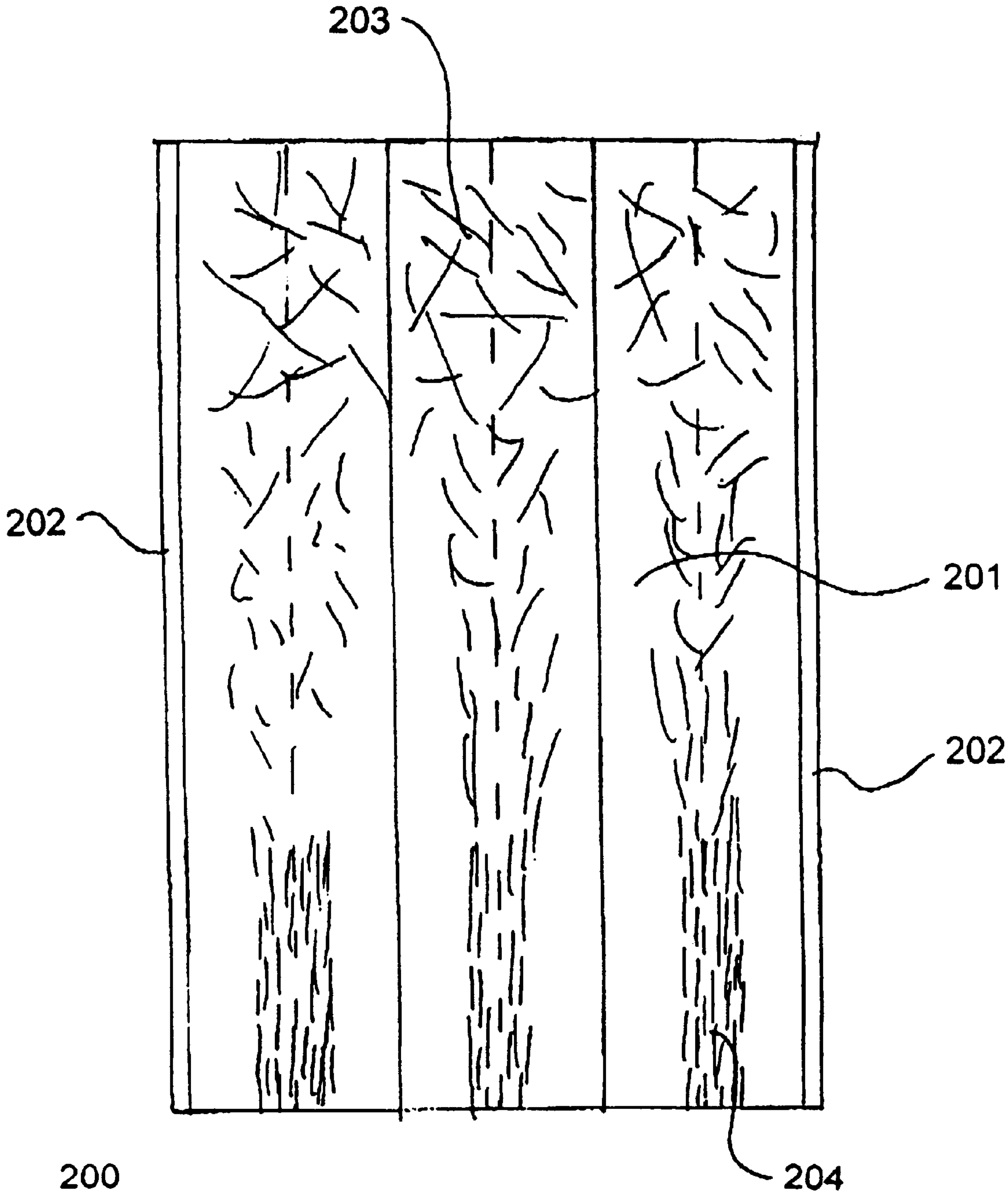
FIG. 16 illustrates a plan view of the split straw orienter according to the invention.

Referring to FIG. 16 a plan view of the split straw orienter 200 is shown. The randomly oriented split straw 203 is deposited onto the board 201 at the elevated end. Due to the transverse vibration of the corrugated surface and gravitational action the split straw strands accumulate in the grooves of the corrugated surface being aligned by the groove walls 207, seen in FIG. 13. The tilting of the board 201 ensures the movement of the split straw strands during the aligning process to the lower end of the board 201 by gravitational action.

Of course, numerous other embodiments may be envisaged without departing from the spirit and scope of the claimed invention.

What is claimed is:

1. A device for longitudinally splitting pieces of straw into separated strands for use in making a panel, board or beam, comprising:

- a gripping shear roller rotatable around its longitudinal axis in a predetermined direction of rotation and at a predetermined circumferential speed for gripping and transporting pieces of straw, the gripping shear roller having parallel grooves oriented at a predetermined angle from the roller axis;
- a cutting shear roller rotatable around its longitudinal axis in opposite direction and at a predetermined circumferential speed substantially higher than the circumferential speed of the gripping shear roller for longitudinally splitting the pieces of straw, the cutting shear roller having parallel grooves with cutting edges oriented at a predetermined angle from the roller axis such that the parallel grooves of the cutting shear roller cross the grooves of the gripping shear roller to provide a scissoring action wherein the grooves of the cutting shear roller are oriented at a greater angle from the roller axis than the grooves of the gripping shear roller;
- supporting bench for rotatably holding the cutting shear roller;
- a support for rotatably holding the gripping shear roller and for ensuring that the gripping shear roller and the cutting shear roller are maintained at least a minimum distance apart to provide sufficient clearance for transporting the split straw strands between the gripping shear roller and the cutting shear roller, wherein the sufficient clearance is provided by an adjustment mechanism which comprises a tension spring and a screw drive affixed to the supporting bench and the support; and,
- an electric motor for driving the cutting shear roller and the gripping shear roller using V-belts and drive chains.

2. A device for longitudinally splitting pieces of straw into separated strands for use in making a panel, board or beam, as defined in claim 1, wherein the support comprises a supporting arm pivoted to the supporting bench.

3. A device for longitudinally splitting pieces of straw into separated strands for use in making a panel, board or beam, as defined in claim 1, wherein the electric motor comprises a variable-speed electric motor.

4. A device for longitudinally splitting pieces of straw into separated strands for use in making a panel, board or beam, as defined in claim 1, wherein the gripping shear roller and the cutting shear roller have a same diameter and rotate with different rotational speed.

5. A device for longitudinally splitting pieces of straw into separated strands for use in making a panel, board or beam, as defined in claim 1, wherein the gripping shear roller and the cutting shear roller have a different diameter.

6. A device for longitudinally splitting pieces of straw into separated strands for use in making a panel, board or beam, as defined in claim 1, wherein the cutting edges are oriented substantially perpendicular to the circumference of the cutting shear roller facing into the direction of rotation.

7. A device for longitudinally splitting pieces of straw into separated strands for use in making a panel, board or beam, as defined in claim 1, wherein the grooves of the gripping shear roller comprise cutting edges facing against the direction of rotation.

8. A device for longitudinally splitting pieces of straw into separated strands for use in making a panel, board or beam, as defined in claim 1, wherein the grooves have a depth between 0.2 mm and 2.0 mm.

9. A device for longitudinally splitting pieces of straw into separated strands for use in making a panel, board or beam, as defined in claim 1, wherein the sufficient clearance is between 0.05 mm and 0.5 mm.

10. A device for longitudinally splitting pieces of straw into separated strands for use in making a panel, board or beam, as defined in claim 1, comprising a feed table affixed to the supporting arm for feeding the pieces of straw substantially parallel to the axes of the shear rollers, the feed table being inclined towards the clearance between the shear rollers.

11. A device for longitudinally splitting pieces of straw into separated strands for use in making a panel, board or beam, as defined in claim 1, comprising a turbulence control barrier mounted adjacent to the cutting shear roller for preventing the pieces of straw from being blown around.

12. A device for longitudinally splitting pieces of straw into separated strands for use in making a panel, board or beam, as defined in claim 1, comprising a sharpening mechanism mounted adjacent to the cutting shear roller for sharpening the cutting edges.

13. A device for longitudinally splitting pieces of straw into separated strands for use in making a panel, board or beam, as defined in claim 1, comprising a split straw orienter for aligning the split straw strands, the split straw orienter being disposed to receive the split straw strands leaving the shear rollers.

14. A device for longitudinally splitting pieces of straw into separated strands for use in making a panel, board or beam, as defined in claim 13, wherein the split straw orienter comprises a tilted board having a corrugated surface, the board being vibrated transversely to ensure movement of the split straw strands.

15. A device for longitudinally splitting pieces of cereal straw into separated strands for use in making a panel, board or beam, comprising:

- a first cutting stage for longitudinally splitting pieces of straw comprising:
  - a first gripping shear roller rotatable around its longitudinal axis in a predetermined direction of rotation and at a predetermined circumferential speed for gripping and transporting pieces of straw, the gripping shear roller having parallel grooves oriented at a predetermined angle from the roller axis;
  - a first cutting shear roller rotatable around its longitudinal axis in opposite direction and at a predetermined circumferential speed substantially higher than the circumferential speed of the gripping shear roller for longitudinally splitting the pieces of straw, the cutting shear roller having parallel grooves with cutting edges oriented at a predetermined angle from the roller axis such that the parallel grooves of the cutting shear roller cross the grooves of the gripping shear roller to provide a scissoring action, wherein the grooves of the cutting shear roller are oriented at a greater angle from the roller axis than the grooves of the gripping shear roller;
- a second cutting stage for longitudinally splitting split straw strands received from the first stage comprising:
  - a second gripping shear roller rotatable around its longitudinal axis in a predetermined direction of rotation and at a predetermined circumferential speed for gripping and transporting split straw strands received from the first stage, the gripping shear roller having parallel grooves oriented at a predetermined angle from the roller axis;
  - a second cutting shear roller rotatable around its longitudinal axis in opposite direction and at a predetermined circumferential speed substantially higher than the circumferential speed of the gripping shear roller for longitudinally splitting the split straw strands received from the first stage, the cutting shear roller having parallel grooves with cutting edges oriented at a predetermined angle from the roller axis such that the parallel grooves of the cutting shear roller cross the grooves of the gripping shear roller to provide a scissoring action;
- a supporting bench for rotatably holding the first and second cutting shear roller;
- a first support affixed to the supporting bench for rotatably holding the first gripping shear roller at a predetermined clearance parallel to the first cutting shear roller, wherein the predetermined clearance is provided by an adjustment mechanism which comprises a tension spring and a screw drive affixed to the supporting bench and the support;
- a second support affixed to the supporting bench for rotatably holding the second gripping shear roller at a predetermined clearance parallel to the second cutting shear roller;
- a drive mechanism for driving the first cutting stage shear rollers and the second cutting stage shear rollers; and,
- an inclined bridging plate mounted to the supporting bench for receiving the split straw strands from the first cutting stage and for providing the same to the second cutting stage.

16. A device for longitudinally splitting pieces of cereal straw into separated strands for use in making a panel, board or beam, as defined in claim 15, wherein the predetermined clearance between the second gripping shear roller and the second cutting shear roller is smaller than the predetermined clearance between the first gripping shear roller and the first cutting shear roller.

17. A device for longitudinally splitting pieces of cereal straw into separated strands for use in making a panel, board or beam, as defined in claim 15, wherein the grooves of the shear rollers of the second cutting stage have less depth than the grooves of the shear rollers of the first cutting stage.

* * * * *